United States Patent
Newport

(10) Patent No.: US 7,739,687 B2
(45) Date of Patent: Jun. 15, 2010

(54) APPLICATION OF ATTRIBUTE-SET POLICIES TO MANAGED RESOURCES IN A DISTRIBUTED COMPUTING SYSTEM

(75) Inventor: William T. Newport, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1509 days.

(21) Appl. No.: 11/068,338

(22) Filed: Feb. 28, 2005

(65) Prior Publication Data

US 2006/0195560 A1 Aug. 31, 2006

(51) Int. Cl.
G06F 9/46 (2006.01)
G06F 15/173 (2006.01)
G06F 17/00 (2006.01)

(52) U.S. Cl. .................. 718/104; 709/223; 709/224; 709/225; 709/226; 709/229; 726/1

(58) Field of Classification Search .............. 718/104; 709/223–226, 229; 726/1
See application file for complete search history.

(56) References Cited

U.S. PATENT DOCUMENTS

| | | | | |
|---|---|---|---|---|
| 6,141,410 A * | 10/2000 | Ginzboorg | ............. | 379/221.01 |
| 7,240,015 B1 * | 7/2007 | Karmouch et al. | ............. | 705/4 |
| 7,266,538 B1 * | 9/2007 | Shatil | ............. | 707/1 |
| 7,463,587 B2 * | 12/2008 | Rajsic et al. | ............. | 370/238 |
| 2003/0018766 A1 * | 1/2003 | Duvvuru | ............. | 709/223 |
| 2003/0126190 A1 * | 7/2003 | Wada et al. | ............. | 709/201 |
| 2003/0177150 A1 | 9/2003 | Fung et al. | | |
| 2003/0187817 A1 * | 10/2003 | Agrawal et al. | ............. | 707/1 |
| 2003/0233433 A1 | 12/2003 | Halpern | | |
| 2004/0225877 A1 * | 11/2004 | Huang | ............. | 713/100 |
| 2005/0060427 A1 * | 3/2005 | Phillips et al. | ............. | 709/238 |
| 2005/0111467 A1 | 5/2005 | Ng et al. | | |
| 2005/0138061 A1 * | 6/2005 | Kuehr-McLaren et al. | .. | 707/102 |
| 2005/0149940 A1 * | 7/2005 | Calinescu et al. | ............. | 718/104 |
| 2006/0294219 A1 * | 12/2006 | Ogawa et al. | ............. | 709/224 |
| 2008/0040459 A1 | 2/2008 | Donatelli et al. | | |

FOREIGN PATENT DOCUMENTS

WO WO 2004/044677 A2 5/2004

OTHER PUBLICATIONS

"Beyond SelfReliant Basic Availability Management (SR-BAM): Upgrading to SelfReliant Advanced Suite," GoAhead Software Incorporated, www.goahead.com.

* cited by examiner

*Primary Examiner*—Meng-Ai An
*Assistant Examiner*—Kenneth Tang
(74) *Attorney, Agent, or Firm*—Wood, Herron & Evans, LLP

(57) ABSTRACT

An apparatus, program product and method utilize sets of attributes respectively associated with managed resources and policies to match managed resources with individual policies. Multiple managed resources are permitted to be matched with a specific policy, such that the policy applies to all matching managed resources. Furthermore, by providing multiple attributes upon which to match, policies are capable of being defined with varying degrees of specificity, enabling administrators to utilize more generic policies for certain types of managed resources, with more specific policies used to override certain managed resources whenever needed.

24 Claims, 2 Drawing Sheets

APPLICATION OF ATTRIBUTE-SET POLICIES TO MANAGED RESOURCES IN A DISTRIBUTED COMPUTING SYSTEM

CROSS-REFERENCE TO RELATED APPLICATIONS

This application is related to U.S. patent application Ser. No. 11/068,262, filed on even date herewith by William T. Newport, and entitled "APPLICATION OF RESOURCE-DEPENDENT POLICIES TO MANAGED RESOURCES IN A DISTRIBUTED COMPUTING SYSTEM," (hereinafter the "Newport application") (ROC920040233US1), which application is incorporated by reference herein.

FIELD OF THE INVENTION

The invention is generally directed to distributed computing systems, and in particular, to the management of resources in distributed computing systems.

BACKGROUND OF THE INVENTION

Distributed computing systems have found application in a number of different computing environments, particularly those requiring high performance and/or high availability and fault tolerance. In a distributed computing system, multiple computers connected by a network are permitted to communicate and/or share workload. Distributed computing systems support practically all types of computing models, including peer-to-peer and client-server computing.

One particular type of distributed computing system is referred to as a clustered computing system. "Clustering" generally refers to a computer system organization where multiple computers, or nodes, are networked together to cooperatively perform computer tasks. An important aspect of a computer cluster is that all of the nodes in the cluster present a single system image—that is, from the perspective of a client or user, the nodes in a cluster appear collectively as a single computer, or entity. In a client-server computing model, for example, the nodes of a cluster collectively appear as a single server to any clients that attempt to access the cluster.

Clustering is often used in relatively large multi-user computing systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

In many clustered computer systems, the services offered by such systems are implemented as managed resources. Some services, for example, may be singleton services, which are handled at any given time by one particular node, with automatic failover used to move a service to another node whenever the node currently hosting the service encounters a problem. Other services, often referred to as distributed services, enable multiple nodes to provide a service, e.g., to handle requests for a particular type of service from multiple clients.

Resources such as cluster-provided services are typically managed through the use of various types of policies that are necessary for some aspect of a resource's existence. A policy, in general, is any set of rules that may be used to manage the existence and operation of one or more resources, and includes, for example, activation or high availability policies, security policies, rights policies, and other types of management policies. An activation policy may be used, for example, to select a particular node or nodes to use to host a service, and/or to manage how failover occurs in response to a node failure. A security policy may be used, for example, to determine what resources particular users are permitted to access and/or what types of operations those users are permitted to perform. A rights policy may be used, for example, to control access to digital content.

Many conventional policy-based resource management systems require each managed resource to be associated with one policy of a particular type. For example, in a high availability environment, it is often a requirement that each managed resource be controlled by a single activation policy. Otherwise, the applicability of multiple policies to a given managed resource could introduce conflicts between different policies.

Furthermore, many conventional-policy based resource management systems also require the converse relationship—that each policy of a particular type apply to a single managed resource. Put another way, there is a one/one mapping between each managed resource and each policy. As such, every time a new managed resource is created or otherwise added to the system, a new policy must be created for that resource.

By requiring a one/one mapping between resources and policies, however, policy management can become complex and unwieldy as more and more managed resources are added. In many high availability environments, for example, thousands of managed resources may exist, thus requiring a comparable number of policies. While policies may be automatically generated in some circumstances when managed resources are added, nonetheless, the large number of policies that are generated can become an administrative nightmare whenever it is desirable to modify or remove policies. The large number of policies can also constrain system scalability.

Therefore, a significant need continues to exist in the art for a manner of associating policies with managed resources with reduced management overhead and complexity, and improved flexibility and scalability.

SUMMARY OF THE INVENTION

The invention addresses these and other problems associated with the prior art in providing an apparatus, program product and method that utilize sets of attributes respectively associated with managed resources and policies to match managed resources with individual policies. Through the use of sets of attributes, multiple managed resources are permitted to be matched with a specific policy, such that the policy applies to all matching managed resources, which often reduces the number of individual policies that need to be created and managed. Furthermore, in many embodiments, policies are capable of being defined with varying degrees of specificity, enabling administrators to utilize more generic policies for certain types of managed resources, with more specific policies used to override certain managed resources whenever needed.

Therefore, consistent with one aspect of the invention, a policy may be applied to a managed resource in a distributed computer environment by comparing a set of attributes associated with the managed resource to sets of attributes respectively associated with a plurality of policies to select a matching policy from among the plurality of policies, and applying the matching policy to the managed resource.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter utilize attribute sets that are associated with both managed resources and policies, and that are compared to determine which, among a plurality of policies, should be applied to a particular managed resource. An attribute set typically includes multiple attributes, which may be implemented, for example, using name/value pairs. A matching criterion is defined that determines which sets of attributes associated with the available policies most closely match the set of attributes associated with the managed resource, such that a matching policy can be identified for and subsequently applied to the managed resource.

A managed resource, in this context, may be considered in different embodiments to correspond to practically any type of software or hardware entity in a distributed computer system that relies on a policy to manage some aspect of its existence or operation. Likewise, a policy may be considered in different embodiments to correspond to any set of rules capable of being applied to a managed resource to manage some aspect of the resource. Examples of types of polices include, but are not limited to high availability or activation policies, security policies, rights policies, management policies, etc.

In the illustrated embodiment below, for example, resources are implemented as cluster or distributed services resident in a distributed computer system, while policies are high availability or activation policies that control how individual instances of clustered or distributed services are activated or deactivated to handle tasks associated with the services. It will be appreciated by one of ordinary skill in the art having the benefit of the instant disclosure that the principles of the invention may apply to different types of managed resources and policies in other embodiments.

Figure 1:
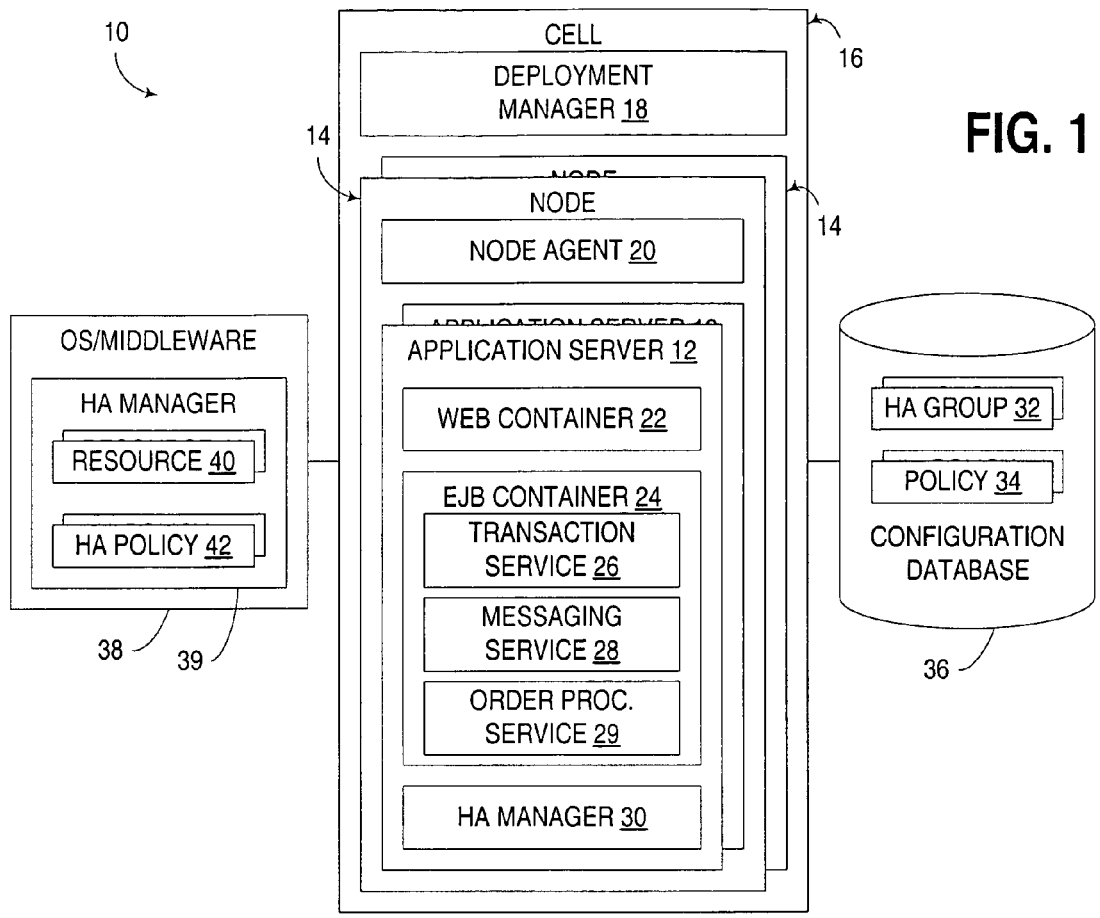
FIG. 1 is a block diagram of a distributed computing system incorporating a policy-based resource management system consistent with the invention.

Turning to the Drawings, wherein like numbers denote like parts throughout the several views, FIG. 1 illustrates an exemplary distributed computing system 10 suitable for implementing a policy-based resource management system consistent with the invention. FIG. 1, in particular, illustrates a distributed computing system incorporating a WebSphere-based application server architecture developed by International Business Machines Corporation, the assignee of the instant application. In this architecture, a set of application servers 12 are logically arranged into a plurality of nodes 14, which are further logically arranged into one or more cells 16. A node 14 typically resides on a single physical computer, although multiple nodes may reside on the same physical computer. Furthermore, a cell 16 is a logically construct that groups together all application servers 12 managed by the same deployment manager 18, which communicates with node agents 20, resident on each node, for performing administrative tasks on each node.

Each application server 12 represents a process resident on a node and used to execute one or more applications, e.g., as may be installed within various containers such as a web container 22 and an Enterprise Java Bean (EJB) container 24. Moreover, the applications hosted by each application server 12 may be clustered to provide clustered services with load balancing and/or failover capabilities.

By way of example, FIG. 1 illustrates a transaction service 26, a messaging service 28, and a order processing service 29 resident in EJB container 24. Services 26, 28 represent singleton services, which are typically active in only one application server at a time, while order processing service 29 represents a distributed service, which may be active in multiple application servers at the same time, e.g., to balance workload received from multiple clients. Load balancing is typically utilized only for order processing service 29, while failover is typically desirable for all of services 26, 28 and 29.

In the illustrated embodiment, each service 26, 28 and 29 represents a managed resource in distrusted computer system 10. One manner in which each such resource is managed is through the use of an activation or high availability policy. Specifically, as illustrated in FIG. 1, each application server 12 may incorporate a high availability manager 30, itself a distributed service, which is used to manage one or more high availability groups 32 using one or more high availability or activation policies 34.

Groups 32 and policies 34 are typically persisted in a configuration database 36 accessible to each node 14 in a cell 12. Database 36, or portions thereof, may be replicated on each node 14 in some embodiments.

Each group 32 logically represents a collection of application instances, or members, resident in one or more application servers 12, and collectively providing a service. In this context, each group 32 defines the membership of application instances for a resource being managed by the high availability manager service. As such, typically a group 32 will be defined for each of example services 26, 28 and 29.

Each policy 34, in term, is used to define the activation policy for one or more associated groups 32. Specifically, a policy 34 defines how many and which individual instances of a service will be activated at any given time. In addition, each policy defines how failover is accomplished whenever an active member fails, as well as whether failback is supported whenever a member becomes available.

For example, a policy 34 may define a number of different policy types, e.g., an all active policy (where all members are active at the same time), an M of N policy (where a maximum of M of N members are active at the same time), a one of N policy (where only one member is active at a given time), a no operation policy (for policies that are not directly managed by the high availability manager service 30), and a static policy (where a singleton service is permitted to execute on only one specific member, and failover is not supported).

Furthermore, for certain policies, it may be desirable to provide additional policy configuration parameters in a policy 34. For example, it may be desirable to provide an ordered list of preferred servers that is used to prioritize members. It may also be desirable to limit activation to only those members residing on preferred servers. It may also be desirable to provide a fail back indication that controls whether a service will be moved back to a more preferred server when one becomes available, and/or a quorum indication that controls whether a quorum is required before activating a service.

An additional parameter that may be supplied in a policy is an indication of one or more externally-managed resources upon which a resource managed by a policy 34 is dependent. Specifically, in the illustrated embodiment, other resources in distributed computer system 10 are externally from the application server architecture defined within each cell 16. These resources may be managed, for example, in an underlying operating system or middleware product, e.g., as illustrated at 38, and administered by a high availability manager 39 resident therein using resource objects 40 and high availability policies 42. The resource objects 40 may represent, for example, resources such as network storage devices such as SAN disks, file systems, direct access storage devices (DASD's), and database servers, as well as management services therefor and/or entities used thereby, e.g., network addresses, communication ports, hardware adapters, etc.

In the illustrated embodiment, a managed resource that is dependent upon an externally-managed resource is managed by a policy in part through the use of a parameter in the policy 34 therefor that identifies the resource dependency. As an example, a transaction service such as transaction service 26 may be dependent upon a Journal File System (JFS) on a SAN disk to store transaction logs used by the transaction service. While a SAN disk may be shared by multiple nodes, only one node may be permitted to mount a JFS file system at a time, and as a result, it may be necessary for the transaction service to be collocated on the same node as the JFS file system. Accordingly, the transaction service would be considered to be dependent upon the JFS file system resource, and as such, the policy 34 that applies to the transaction service desirably includes an indication that the policy is dependent upon an externally-managed resource (the JFS file system). The mechanism by which resource dependencies are managed in a manner consistent with the invention is discussed in the aforementioned cross-referenced Newport application.

Various types of middleware or operating system managers may be used for high availability manager 39, e.g., the HACMP manager available from International Business Machines Corporation, among others. Moreover, the types of externally-managed resources upon which a policy 34 may be dependent may vary in different embodiments.

In the illustrated embodiment, groups 32 and policies 34 are associated with one another via match criteria based upon sets of attributes associated with each group and each policy. In particular, each group 32 is required to match with a single policy 34 such that one policy is used to manage the activation of members in a group. However, each policy 34 may be associated with multiple groups 32. The manner in which groups and policies are associated with one another in a manner consistent with the invention is discussed in greater detail below.

Figure 2:
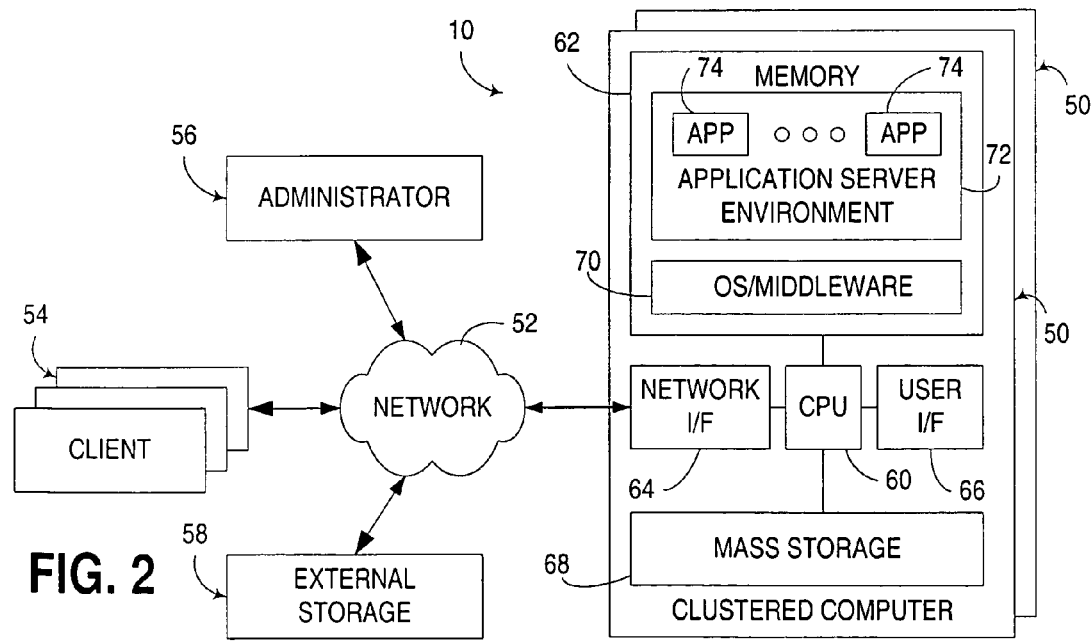
FIG. 2 is a block diagram of an exemplary hardware implementation of the distributed computing system of FIG. 1.

The manner in which distributed computer system 10 may be implemented in hardware may vary in different implementations. For example, FIG. 2 illustrates on exemplary implementation of system 10, incorporating a plurality of clustered computers 50 interfaced with one another via a network 52. As will be appreciated in the art, network 52 may be implemented using any combination of LAN's, WAN's, point-to-point interconnects, and/or various other networking topologies. Furthermore, network 52 may represent multiple distinct networks in some embodiments. Computers 50 may be located in close geographical proximity with one another, or may be geographically dispersed.

Also illustrated as coupled to network 52 are a plurality of client computers 54, which may be connected to clustered computers 50 via private and/or public networks such as the Internet to perform tasks using the application server architecture described herein. For administration purposes, one or more administrator computers 56 may also be coupled to network 52. In addition, it will be appreciated that various other types of components may be coupled to network 52, e.g., external storage 58 such as a storage area network, network addressed storage, or various other persistent storage systems known in the art.

Each computer 50 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Each computer 50 generally includes a central processing unit (CPU) 60 including one or more system processors and coupled to a memory or main storage 62, typically through one or more levels of cache memory (not shown). Furthermore, CPU 60 may be coupled to additional peripheral components, e.g., one or more networks 52 via a network interface 64, various input/output devices (e.g., a control panel, display, keyboard, mouse and/or dedicated workstation, etc.) via a user interface 66, and mass storage 68 (e.g., a DASD or one or more disk drives). Any number of alternate computer architectures may be used in the alternative.

Each computer 50 is further configured to host a number of levels of software suitable for implementing a distributed computer environment. Shown resident in memory 62 is operating system and/or middleware program code 70, as well as application server environment program code 72, e.g., the aforementioned WebSphere-based architecture, within which reside one or more applications 74.

The discussion hereinafter will focus on the specific routines utilized to implement the above-described policy management functionality. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
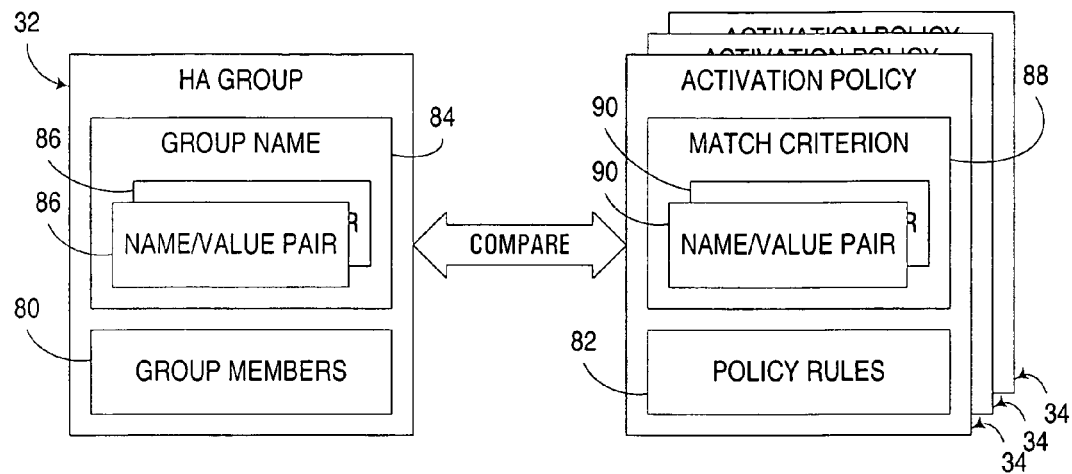
FIG. 3 is a block diagram of exemplary high availability group and activation policy data structures for use in the distributed computing system of FIG. 1.

Now turning to FIG. 3, exemplary data structure implementations of each high availability group 32 and activation policy 34 are illustrated. In the illustrated embodiments, each group 32 and activation policy 34 is implemented as an object, incorporating both data associated with the respective entity, as well as one or more methods suitable for performing actions on such entities.

As noted above, each group 32 represents a managed resource such as a cluster service. In this regard, each group 32 includes, in the least, a list of group members 80, representing the individual instances of the managed resource that are resident in the system. Other information may also be maintained in each group 32, such as the activation/deactivation status of each member, a list of nodes upon which such members are resident and/or the status of each node, communication settings, description information, etc.

Likewise, each policy 34 includes one or more policy rules 82 that define the parameters of the policy, including, as noted above, information such as the type of policy, a list of preferred servers, a fail back indication, and any externally-managed resources for which dependencies exist. Each policy 34 is configured to operate such that when given the set of current online servers that are candidates for hosting a managed resource, as well as the set of servers that were previously in this membership but are now unresponsive, the policy is able to ascertain whether the state (Active/Idle) associated with each server meets the policy definition, and if not, selectively activate or deactivate one or more instances of the managed resource to comply with the policy definition.

Each group 32 also includes a group name 84 that includes a set of name/value pairs 86, and that serves to uniquely identify the group. For example, the group name 84 may be implemented in a similar manner to the X.500 naming protocol. Likewise, each policy includes a match criterion (or match set) 88 that includes a set of name/value pairs 90, and that is used to match the policy with one or more groups. By utilizing multiple name/value pairs, policies may be defined in a flexible and scalable manner to apply to multiple managed resources, thereby substantially simplifying policy administration.

The manner in which a policy may be applied to a managed resource may vary in different embodiments. In the illustrated embodiment, a policy is given the set of current online servers that are members of the high availability group. If some servers were previously a member of the group and failed then this set is also provided. A policy is applied by the high availability manager whenever the set of members for a resource group changes (e.g., a member joins/leaves the group or a member fails) or the state associated with a member changes (e.g., active/idle/disabled). The policy accepts these parameters as well as a callback interface which allows the policy to tell the high availability manager that a member should be activated or deactivated. When the high availability manager sees a member change state then it invokes the policy to enforce itself on the set of members in the group. If a member is disabled then the policy excludes it from it's set of candidates for activate/deactivate events.

Figure 4:
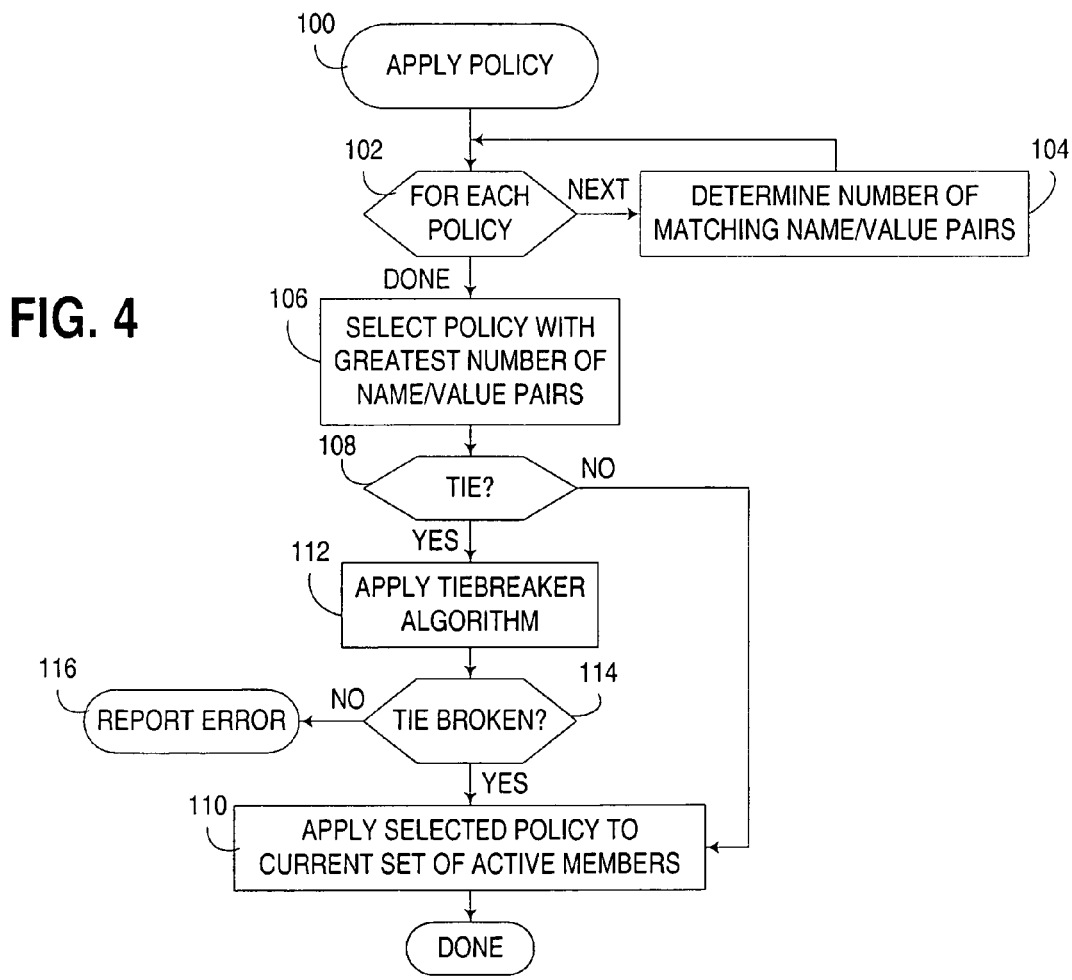
FIG. 4 is a flowchart illustrating an apply policy routine implemented in the high availability manager referenced in FIG. 1.

As one example of the application of a policy in distributed computer system 10, FIG. 4 illustrates an apply policy routine 100, which may be executed, for example, by each node in a distributed computer environment to locally apply a policy to a managed resource in a manner consistent with the invention. Routine 100 may be initiated, for example, in response to an event received by a high availability manager indicating that one or more nodes have been added or removed from the distributed computing system, thus indicating that the set of active members for a resource has changed.

Routine 100 begins in block 102 by initiating a FOR loop to process through the available policies and calculate a score for each policy relative to the managed resource to which a policy is to be applied. For each such policy, control passes to block 104 to compare the name/value pairs for the policy with the name/value pairs in the group name for the managed resource to determine the number of matching name/value pairs for the policy. Then, once each policy has been scored, block 102 passes control to block 106 to select as the matching policy the policy having the greatest number of matching name/value pairs. Block 108 then determines whether a tie was encountered, i.e., where more than one policy has the greatest number of matching name/value pairs.

If no tie is encountered, block 108 passes control to block 110 to apply the selected policy to the current set of active members (or instances) of the managed resource, whereby routine 100 is complete. If, on the other hand, a tie is encountered, block 108 passes control to block 112 to apply a tiebreaker algorithm. If the tiebreaker algorithm is able to select one policy, block 114 passes control to block 110 to apply the selected policy. Otherwise, block 114 passes control to block 116 to report an error and terminate without applying any policy to the managed resource.

In the illustrated embodiment, each group is required to have exactly one matching policy. A policy is defined to match a group which it's match set has the most common name/values pairs with the set of name/value pairs from the resource group name. If two or more policies match a group then an error is reported, or alternatively, a tiebreaker algorithm is applied. In other embodiments, each name may be given a priority or weighting value such that the comparison of the match sets with the group name are not strictly based upon a numerical count of matching name/value pairs. In still other embodiments, priorities or weighting values may not be applied except as a tiebreaker.

Other types of tiebreaker algorithms may be used in other embodiments, and it may be desirable in some embodiments to report an error if a tiebreaker algorithm is unable to select one matching policy. Moreover, multiple levels of tiebreakers may be used in some embodiments. Typically, an error may be resolved by adding more name/values pairs to a match set for a policy, or by making the resource group name more specific.

By utilizing multiple attributes such as name/value pairs both to uniquely identify managed resources and policies, policy management can be very flexible. For example, it may be desirable to provide one or more default policies that are specified with general match sets, and then override the application of entire classes of managed resources by defining other policies incorporating additional and more specific attributes. As an example, for a managed resource such as a messaging service, it may be desirable to define an attribute set such as shown in Table I below:

TABLE I

EXAMPLE ATTRIBUTE SET FOR MESSAGING SERVICE

| Name | Value | Match Targets |
| --- | --- | --- |
| type | WASF_SIB | All messaging engines |
| WSAF_SIB_MESSAGING_ENGINE | Name of specific messaging engine | One particular type of messaging engine |
| WSAF_SIB_BUS | Name of a specific bus | All messaging engines in a bus |
| IBM_hc | Name of a specific cluster | All messaging engines in a cluster |

One policy may be defined with a value supplied only for the type name/value pair, and thus apply as a default for all messaging engines in a distributed computer system. Then, for example, should an administrator wish to use a different policy for all messaging engines in a particular bus, a different policy may be defined including an additional value for the WSAF_SIB_BUS name/value pair, whereby any messaging services that match on both name/value pairs will be controlled by the more specific policy, rather than the more general.

As another example, for a managed resource such as a transaction service, it may be desirable to define an attribute set such as shown in Table II below:

TABLE II

EXAMPLE ATTRIBUTE SET FOR TRANSACTION SERVICE

| Name | Value | Match Targets |
| --- | --- | --- |
| type | WASF_TRANSACTIONS | All transaction managers |
| IBM_hc | Name of a specific cluster | All transaction managers in a cluster |
| GN_PS | Name of specific server | One particular transaction manager |

It will be appreciated that the aforementioned functionality may be implemented in a number of manners consistent with the invention. For example, policies and groups/managed resources may be implemented as objects, with appropriate interfaces provided in each type of object to enable such objects to be queried for their relevant name/value pairs. Furthermore, it may be desirable to implement attribute comparison functionality directly within the objects representing groups/managed resources and/or policies. It may also be desirable to utilize an event-driven interface in such objects, e.g., to enable an activation policy to be automatically applied to a group in response to an event generated upon a change in the membership of the group (e.g., when a group member is added or removed from a group).

It will be appreciated that various additional modifications may be made to the illustrated embodiments without departing from the spirit and scope of the invention. Therefore, the invention lies in the claims hereinafter appended.

What is claimed is:

1. A method of applying a policy to a managed resource in a distributed computer environment, the method comprising:
comparing a set of attributes associated with the managed resource to sets of attributes respectively associated with a plurality of policies to select a matching policy from among the plurality of policies, wherein comparing the set of attributes associated with the managed resource to the sets of attributes respectively associated with the plurality of policies includes applying a tiebreaker algorithm in response to multiple policies matching the most attributes; and
applying the matching policy to the managed resource.

2. The method of claim 1, wherein the managed resource comprises a service provided by the distributed computer environment, and wherein the policy comprises an activation policy that controls activation of instances of the managed resource resident on a plurality of computers in the distributed computer environment.

3. The method of claim 2, wherein applying the matching policy to the managed resource comprises activating an instance of the resource.

4. The method of claim 2, wherein applying the matching policy to the managed resource comprises deactivating an instance of the resource.

5. The method of claim 2, wherein applying the matching policy is performed responsive to a change in an activation status of at least one of the plurality of computers in the distributed computer environment.

6. The method of claim 2, wherein the managed resource is selected from the group consisting of a transaction service, a messaging service, a clustered service, an application server process, and combinations thereof.

7. The method of claim 1, wherein the set of attributes associated with the managed resource comprises a plurality of name/value pairs that uniquely identify the managed resource.

8. The method of claim 7, wherein the set of attributes associated with each policy includes a plurality of name/value pairs, and wherein comparing the set of attributes associated with the managed resource to the sets of attributes respectively associated with the plurality of policies includes determining a number of name/value pairs associated with each policy that match the name/value pairs associated with the managed resource, and selecting as the matching policy that policy matching the most name/value pairs.

9. A method of applying a policy to a managed resource in a distributed computer environment, the method comprising:
    comparing a set of attributes associated with the managed resource to sets of attributes respectively associated with a plurality of policies to select a matching policy from among the plurality of policies; and
    applying the matching policy to the managed resource,
wherein the set of attributes associated with the managed resource comprises a plurality of name/value pairs that uniquely identify the managed resource, and wherein comparing the set of attributes associated with the managed resource to the sets of attributes respectively associated with the plurality of policies includes applying a tiebreaker algorithm in response to multiple policies matching the most name/value pairs.

10. The method of claim 9, further comprising signaling an error in response to the tiebreaker algorithm being unable to break a tie between the multiple policies.

11. The method of claim 7, wherein the set of attributes associated with each policy includes a plurality of name/value pairs, and wherein comparing the set of attributes associated with the managed resource to the sets of attributes respectively associated with the plurality of policies includes applying a weight to at least one attribute.

12. An apparatus, comprising:
    a computer resident in a distributed computer environment; and
    program code resident in the computer and configured to apply a policy to a managed resource in the distributed computer environment by comparing a set of attributes associated with the managed resource to sets of attributes respectively associated with a plurality of policies to select a matching policy from among the plurality of policies, and applying the matching policy to the managed resource, wherein the program code is configured to compare the set of attributes associated with the managed resource to the sets of attributes respectively associated with the plurality of policies by applying a tiebreaker algorithm in response to multiple policies matching the most attributes.

13. The apparatus of claim 12, wherein the managed resource comprises a service provided by the distributed computer environment, and wherein the policy comprises an activation policy that controls activation of instances of the managed resource resident on a plurality of computers in the distributed computer environment.

14. The apparatus of claim 13, wherein the program code is configured to apply the matching policy to the managed resource by activating an instance of the resource.

15. The apparatus of claim 13, wherein the program code is configured to apply the matching policy to the managed resource by deactivating an instance of the resource.

16. The apparatus of claim 13, wherein the program code is configured to apply the matching policy responsive to a change in an activation status of at least one of the plurality of computers in the distributed computer environment.

17. The apparatus of claim 13, wherein the managed resource is selected from the group consisting of a transaction service, a messaging service, a clustered service, an application server process, and combinations thereof.

18. The apparatus of claim 12, wherein the set of attributes associated with the managed resource comprises a plurality of name/value pairs that uniquely identify the managed resource.

19. The apparatus of claim 18, wherein the set of attributes associated with each policy includes a plurality of name/value pairs, and wherein the program code is configured to compare the set of attributes associated with the managed resource to the sets of attributes respectively associated with the plurality of policies by determining a number of name/value pairs associated with each policy that match the name/value pairs associated with the managed resource, and selecting as the matching policy that policy matching the most name/value pairs.

20. The apparatus of claim 18, wherein the program code is configured to compare the set of attributes associated with the managed resource to the sets of attributes respectively associated with the plurality of policies by applying a tiebreaker algorithm in response to multiple policies matching the most name/value pairs.

21. The apparatus of claim 20, wherein the program code is further configured to signal an error in response to the tiebreaker algorithm being unable to break a tie between the multiple policies.

22. The apparatus of claim 18, wherein the set of attributes associated with each policy includes a plurality of name/value pairs, and wherein the program code is configured to compare the set of attributes associated with the managed resource to the sets of attributes respectively associated with the plurality of policies by applying a weight to at least one attribute.

23. A distributed computer system, comprising:
    a plurality of computers interconnected to one another; and
    program code resident in at least a subset of the plurality of computers and configured to apply a policy to a managed resource by comparing a set of attributes associated with the managed resource to sets of attributes respectively associated with a plurality of policies to select a matching policy from among the plurality of policies, and applying the matching policy to the managed resource, wherein the program code is configured to compare the set of attributes associated with the managed resource to the sets of attributes respectively associated with the plurality of policies by applying a tiebreaker algorithm in response to multiple policies matching the most attributes.

24. A program product, comprising:
    program code configured upon execution to apply a policy to a managed resource in a distributed computer environment by comparing a set of attributes associated with the managed resource to sets of attributes respectively associated with a plurality of policies to select a matching policy from among the plurality of policies, and applying the matching policy to the managed resource, wherein the program code is configured to compare the set of attributes associated with the managed resource to the sets of attributes respectively associated with the plurality of policies by applying a tiebreaker algorithm in response to multiple policies matching the most attributes; and
    a computer readable recordable type medium bearing the program code.

* * * * *